United States Patent [19]
McWethy, Jr.

[11] Patent Number: 5,596,831
[45] Date of Patent: Jan. 28, 1997

[54] FISHING LURE WITH SELECTABLE HOOK ORIENTATION

[76] Inventor: William H. McWethy, Jr., P.O. Box 8441, Rancho Santa Fe, Calif. 92067

[21] Appl. No.: 393,816

[22] Filed: Feb. 24, 1995

[51] Int. Cl.$^6$ ................................................ A01K 85/00
[52] U.S. Cl. ................................................ 43/42.36
[58] Field of Search .................... 43/42.25, 42.36, 43/42.06, 42.31, 44.9, 44.83, 44.87, 42.53, 44.98

[56] References Cited

U.S. PATENT DOCUMENTS

| | | | |
|---|---|---|---|
| 779,744 | 1/1905 | Shakespeare, Jr. | 43/42.36 |
| 3,269,050 | 8/1966 | Garwood | 43/42.36 |
| 3,867,781 | 2/1975 | Wolfe | 43/42.36 X |
| 3,914,895 | 10/1975 | Mize | 43/42.1 X |
| 3,947,990 | 5/1976 | Johnson | 43/44.9 |
| 5,040,325 | 8/1991 | Herrmann | 43/42.36 |
| 5,113,607 | 5/1992 | Pate | 43/42.36 X |

*Primary Examiner*—J. Elpel
*Attorney, Agent, or Firm*—Calif Tervo

[57] ABSTRACT

A fishing lure in which a hook is connected to the body of the lure in a selectable angular orientation with respect to the longitudinal axis of the body. An elastomeric mounting having a bore is attached to the body. The hook is attached to a leader, and the leader is attached to the line. The connection between the line and leader may include a crimp connector. A user may insert the connector into the mounting bore at any desired rotational angle. The hook is thus frictionally retained in the mounting bore. When the lure is trolled through the water, the hook maintains itself in an orientation with the shank parallel to the leader and the pointed end curving upwardly toward the surface. This orientation maximizes the likelihood that a striking fish will become hooked.

16 Claims, 1 Drawing Sheet

FISHING LURE WITH SELECTABLE HOOK ORIENTATION

BACKGROUND OF THE INVENTION

Fishing lures of the type used for trolling for large gamefish may comprise a body with a longitudinal bore. The body is typically made of a solid or hollow plastic material. The lure may have a skirt made of a pliable material with strands extending rearwardly. The skirt may be attached to the rearward end of the body or may encase the body entirely. A leader, which may be made of wire cable or heavy nylon to protect against severance by sharp fish teeth, extends through the bore and is attached to a hook rearward of the body. To attach the hook to the leader, the leader may be threaded through the end of the hook and tied or crimped with a sleeve to form an eye.

When the lure is pulled through the water, the body tends to roll to and thereafter remain in a particular angular orientation. Typically, features on the body, such as a beveled surface, produce hydrodynamic effects that stabilize the body in this angular orientation, referred to herein as the "natural" orientation. In other lures, the longitudinal bore may be angled or offset from the central axis of the body to produce a similar stabilizing effect. In still other lures, weights may be distributed within the lure body in a manner that produces a similar effect.

When a hook is pulled through the water, it produces hydrodynamic effects that tend to stabilize it in an angular orientation in which the shank is parallel to the leader and the pointed end curves upwardly toward the forwardly facing point. Coincidentally, this orientation, referred to herein as the "natural" orientation, also maximizes the likelihood of a striking fish becoming hooked, due to the direction from which a fish typically strikes a trolled lure. Nevertheless, the hook may not assume its natural orientation as the lure is trolled. Although the lure body and the hook are mechanically arranged to rotate freely with respect to one another, water resistance may cause them to bind when the lure is trolled. If the lure is trolled with the hook in a random orientation with respect to the body, the hydrodynamic effects of the body typically overpower those of the hook, causing the hook to assume a random orientation. Even if the lure is initially placed in the water with the body in its natural orientation and the hook in its natural orientation, the hook may not resume its natural orientation if displaced. A strike that does not result in a "hook-up" can easily displace the hook. If the hook does not return to the natural orientation (or does not return quickly enough before the fish strikes again), the likelihood of a subsequent hook-up is reduced. Not only frictional binding between the hook and body, but entanglement of the hook in the skirt may also prevent the hook from resuming its natural orientation.

Anglers have attempted to overcome the hook orientation problem by minimizing the relative angular rotation between the hook and the body. Because, as described above, the lure body remains in a relatively stable orientation, a hook mounted in a fixed orientation with respect to the body remains in a relatively stable orientation. Permanently mounting the hook to an eye or similar fitting on the body, however, is not a satisfactory solution. It is often necessary for an angler to cut the line to release a fish from which he cannot extract the hook. Although cutting the line results in loss of the hook, the fish can be released relatively unharmed. If the hook were permanently mounted on the body of the lure, cutting the line would result in loss of the entire lure. Furthermore, an angler could not quickly and easily replace one lure with another without changing the hook and vice versa.

Anglers have wedged various objects, such as toothpicks and pieces of tape, into the longitudinal bore in the lure body to secure the leader in a fixed angular orientation with respect to the body. The hook tends to remain in a fixed angular orientation with respect to the body because the hook is relatively rigidly attached to the leader by a knot or crimp connector.

A lure manufactured by Sadu Lures of Jupiter, Fla. under the brand name SADU attempts to solve the problem. The lure has a body made of a hard plastic with a longitudinal bore. A cylindrical plug made of an elastomeric material may be removably mounted in the rearward end of the bore. The plug is thus frictionally gripped in the body bore. The plug also has a bore with a diameter smaller than the diameter of the leader. The plug thus frictionally grips a leader that is threaded through the bore. When the plug is disposed in the body bore and the leader is threaded through the plug bore, relative rotation between the lure and the leader is inhibited. Although the SADU lure addresses the problem, the system cannot be retrofitted to an existing lure body because the SADU body bore must have a diameter larger than that of a conventional lure in order to receive the plug.

It would be desirable to provide a device and method for selectably orienting a hook relative to the body of a lure that can be used with existing lures. These problems and deficiencies are clearly felt in the art and are solved by the present invention in the manner described below.

SUMMARY OF THE INVENTION

The present invention comprises a fishing lure and method in which a hook is connected to the body of the lure in a selectable rotational orientation with respect to the longitudinal axis of the body. The body has suitable features that cause it to maintain a relatively stable angular orientation when trolled through the water. The body has an elastomeric mounting attached to it for receiving the hook. A connector may be used to attach the hook to a leader. A portion of the leader or connector is frictionally retained in the mounting. For example, the portion may be inserted into a receiving bore in the elastomeric mounting that has a diameter slightly less than the diameter of the inserted portion. An angler can quickly and easily orient the hook in any desired rotational orientation and can remove it equally as easily. When the lure is trolled through the water, the body maintains itself in a particular natural orientation. The body anchors the hook in a particular angular orientation because the hook is frictionally maintained in a fixed orientation with respect to the body. The connection between the hook and the portion of the leader or connector that is frictionally retained in the elastomeric mounting may be further stiffened by sheathing the connection with a short length of flexible material, such as tape or tubing.

The foregoing, together with other features and advantages of the present invention, will become more apparent when referring to the following specification, claims, and accompanying drawings.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF PREFERRED EMBODIMENTS

Figure 1:
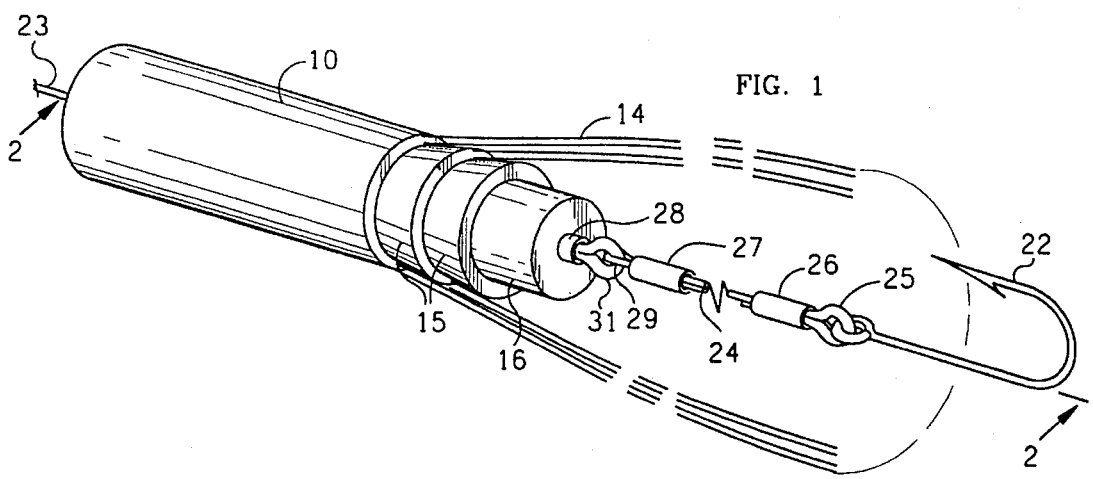
FIG. 1 is a perspective view of the fishing lure, with a portion of the skirt cut away.
Figure 2:
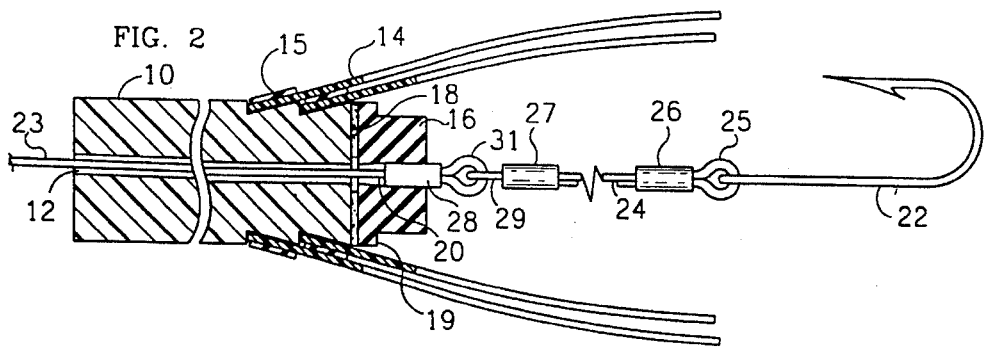
FIG. 2 is a sectional view taken on line 2—2 of FIG. 1.

As illustrated in FIGS. 1–2, a body 10, which may be made of any suitable material, such as polyester resin, has an axial bore 12. A skirt 14 may be disposed over the rearward portion of body 10. A plurality of ridges 15 aid retaining skirt 14 on body 10. Axial bore 12 is not aligned along the longitudinal axis of body 10, but rather is offset slightly from the center of the forward end of body 10 toward the rim of the forward end of body 10, as best shown in FIG. 2. When the lure is trolled through the water by line 23, this offset tends to orient the lure in an angular orientation with the offset toward the surface of the water. (FIG. 2 illustrates this orientation if it is assumed that the elevation of this view is in a plane parallel to the surface of the water.) An offset axial bore 12 is intended only as illustrative of a feature with which body 10 can be provided to cause it to ride in the water in a predetermined orientation. In other embodiments, for example, the body may have features that generate hydrodynamic effects that cause the lure to ride in the water in a predetermined angular orientation. Lure bodies that tend to ride in the water in a predetermined angular orientation, referred to herein as the "natural orientation" of the lure body, are well-known, and those of skill in the art will readily be capable of determining the natural orientation of any lure body.

Figure 5:
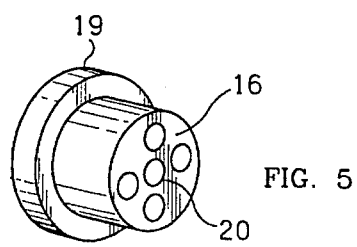
FIG. 5 is a perspective view of the elastomeric mounting block shown in FIG. 2.

A mounting block 16, which is made of an elastomeric material such as rubber, is mounted to the rearward end of body 10 using a suitable adhesive 18 that resists deterioration in salt water, such as PERMA-BOND 910 INDUSTRIAL GRADE, manufactured by Perma-Bond International of Englewood, N.J. Mounting block 18, which is shown in further detail in FIG. 5, preferably has a shoulder 19 that has a diameter substantially equal to that of the rearward end of body 10. Maximizing the diameter of shoulder 19 in this manner maximizes the surface area available for adhesion to body 10. Mounting block 16 has a mounting bore 20 that is substantially axially aligned with bore 12 of body 10. This arrangement allows mounting block 16 to be retrofitted to existing lures having bores of conventional size.

One end of a leader 24 is connected to a hook 22 and the other end is connected to line 23. The connection between hook 22 and leader 24 is preferably formed by threading a loop 25 of leader 24 through the eye of hook 22 and securing it using a suitable crimp connector 26. The connection between leader 24 and line 23 is preferably formed using two crimp connectors 27 and 28. Connector 27 secures a loop 29 in leader 24. Connector 28 secures a loop 31 in line 23 that is interengaged with loop 29.

It should be understood that the terms "leader" and "line" are used for convenience to differentiate the two interconnected elements and are not intended to imply specific materials from which these elements are made. For example, leader 24 may be made of any suitable material, such as wire cable or monofilament. Similarly, line 23 may be made of any suitable material and may be a second leader rather than a line extending the full distance to the fishing rod (not shown).

The connections between leader 24 and line 23 and between leader 24 and hook 22 are critical to the present invention. The connections must be relatively stiff or rigid in the rotational direction. Hook 22 can swivel to some extent about the connection between its eye and loop 25 in both horizontal and vertical directions. Nevertheless, this connection substantially prevents hook 22 and loop 25 from rotating with respect to one another about the longitudinal axis of the lure. Similarly leader 24 can swivel to some extent about the connection between loops 29 and 31, but this connection substantially prevents leader 24 from rotating with respect to line 23.

Crimp connector 28 has a diameter slightly larger than the diameter of mounting bore 20. Crimp connector 28 may be inserted into mounting bore 20, the walls of which expand elastically to frictionally grip crimp connector 28. Connector 28, after it is so inserted, remains rigidly mounted with respect to body 10. Connector 28 may be inserted in any angular orientation with respect to bore 20 (and thus with respect to body 10). The combined effect of connector 28 being rigidly mounted with respect to body 10 and the connections between connector 28, leader 24 and hook 22 being substantially resistant to relative rotation among them, is that hook 22 tends to remain in a predetermined angular orientation with respect to body 10. This angular orientation is determined by the angular orientation in which connector 28 is inserted into bore 20.

in general, when towed through water, the hydrodynamic effects of hook 22 orient it with the barbed end curving upwardly toward the surface of the water, referred to herein as the "natural orientation" of hook 22. A user can select an angular orientation of hook 22 with respect to body 10 that matches the natural orientation of body 10. When the lure is trolled through the water, body 10 and hook 22 ride in their natural orientations. In this orientation, the lure is most effective at achieving a hook-up when a fish strikes the lure.

If hook 22 is disturbed from its natural orientation by, for example, a fish striking at the lure but failing to become hooked, the curved portion of hook 22 may roll or rotate about the shank of hook 22. Nevertheless, hook 22 quickly returns to its natural orientation.

In certain embodiments, the effects of body 10 that cause it to ride in the water in its natural orientation override or swamp the hydrodynamic effects of hook 22 that cause hook 22 to ride in its natural orientation because body 10 is typically more massive or has greater hydrodynamic surface areas than hook 22. In such embodiments, the elasticity of leader 24 may contribute to the ability of hook 22 to return to its natural orientation if disturbed. Leader 24 may twist with respect to body 10 as hook 22 is disturbed from its natural orientation. Body 10 functions in an anchor-like manner and remains oriented in its natural orientation despite the momentary rotation of hook 22. The energy stored in leader 24 as a result of this twisting untwists leader 24 in a spring-like manner. As leader 24 untwists, it reorients hook 22. Leader elasticity will depend on the material from which leader 24 is made and other factors, such as the angular rigidity of the leader connections.

In other embodiments, however, the hydrodynamic effects of hook 22 that cause it to ride in the water in its natural orientation may swamp the effects of body 10 that cause body 10 to ride in the water in its natural orientation. For example, hook 22 may be large in relation to the size of body 10. In such embodiments, hook 22 tends to hold body 10 in a particular angular orientation rather than vice versa. A user may select the angular orientation that the lure body will assume by selecting the angular orientation of the hook with respect to the body, as described above.

In still other embodiments, neither body 10 nor hook 22 will overpower the other. In such embodiments, both body 10 and hook 22 essentially operate independently to maintain the overall orientation of the lure.

Figure 3:
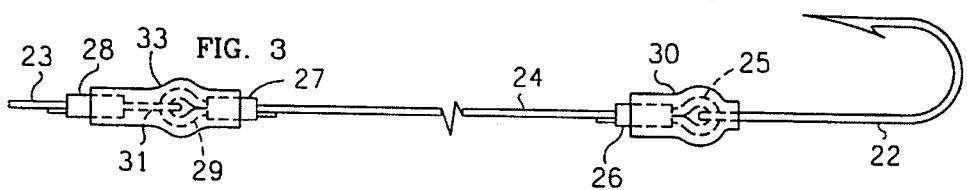
FIG. 3 is a side elevation view of the hook and eye connection with an external stiffener.

As illustrated in FIG. 3, the connections between hook 22 and leader 24 and between line 23 and leader 24 may be stiffened by encasing them in heat-shrink tubing 30 and 33, respectively. Alternatively, waterproof adhesive tape or the like may be used to stiffen these connection. Tubing 30 and 33 essentially eliminates relative rotation between hook 22 and loop connector 28, other than that resulting from twisting of leader 24, thereby maximizing the angular or rotational rigidity between hook 22 to body 10.

Figure 4:
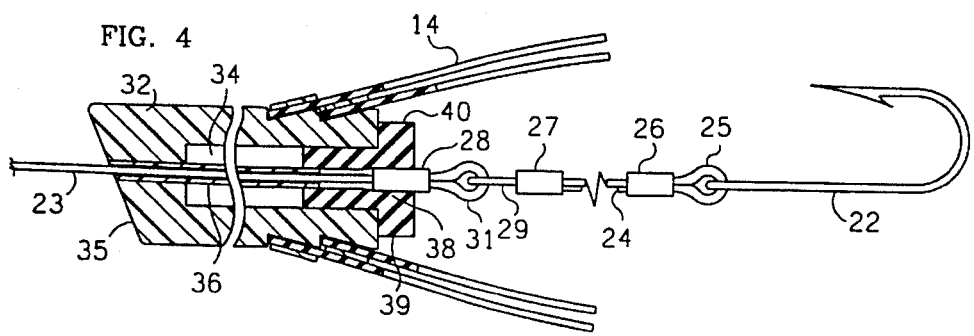
FIG. 4 is a sectional view similar to FIG. 2, showing an alternative body configuration.

As illustrated in FIG. 4, in an alternate embodiment, the lure comprises a body 32 having a cavity 34 and an axial tube 36 extending through a bore in body 32. Body 32 may be transparent, and cavity 34 may be filled with a material (not shown) that is attractive to fish, such as colored material, reflective material, sequins, or noisemakers, as described in the present inventor's co-pending application entitled "FISHING LURE SYSTEM," filed Sep. 15, 1994, Ser. No. 08/306,885. The material may include weights for adjusting the weight of the lure and thereby producing different actions that may be desirable for different water or weather conditions or different species of fish.

Body 32 has a canted or beveled forward end 35. When towed through the water, the hydrodynamic effects of forward end 35 cause the lure to ride in a predetermined angular orientation. (This natural orientation is that which is shown in FIG. 4 if it is assumed that the view elevation of FIG. 4 is in a plane parallel to the surface of the water.) Furthermore, tube 36 is offset slightly from the longitudinal axis of body 32 to further cause body 32 to ride in this orientation. As noted above, those of skill in the art will readily be capable of determining the natural orientation of lure bodies.

Figure 6:
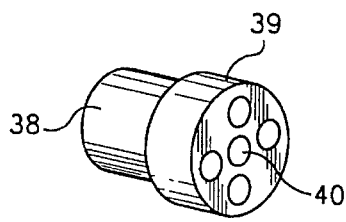
FIG. 6 is a perspective view of the elastomeric mounting block shown in FIG. 4.

A frusto-conical elastomeric mounting block 38, which is shown in further detail in FIG. 6, may be inserted into the open rearward end of body 32 to seal cavity 34. Mounting block 38 preferably has a shoulder 39 that has a diameter greater than that of the opening in the rearward end of body 32. Shoulder 39 maximizes sealing and also facilitates removal of block 38 by providing a portion that can be readily gripped. Hook 22 may be connected to leader 24 in the same manner described above with respect to FIGS. 1-3. Mounting block 38 has a bore 40 with a diameter slightly smaller than the diameter of connector 28. Connector 28 may be inserted into bore 40 of mounting block 38 in any selected orientation in the manner described above with respect to FIGS. 1-2.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

What is claimed is:

1. A fishing lure comprising:

a body having an axis and an axial bore;

an elastomeric mounting attached to said body; and a leader having a longitudinal axis; said leader disposed through said axial bore; said leader including:

a front portion including:
a rear end;

a rear portion including:
a front end; and
a hook end for attachment of a hook; said hook end distal from said front end of said leader rear portion; said leader rear portion sufficiently torsionally rigid such that said hook end has a substantially fixed rotational orientation about said longitudinal axis relative to said front end of said leader rear portion; and connection attached to said rear end of said leader front portion and attached to said front end of said leader rear portion such that said front end of said leader rear portion has a substantially fixed rotational orientation about said longitudinal axis relative to said connection; said connection removably and frictionally retainable in said mounting in one of a plurality of selectable fixed rotational orientations with respect to said axis.

2. The fishing lure claimed in claim 1, wherein:

said mounting has a mounting bore, and said leader extends through said mounting bore.

3. The fishing lure of claim 1 further including:

a sheath of rotationally rigid material encasing the attachment between said connection and said front end of said leader rear portion.

4. The fishing lure of claim 1 further including:

a hook attached to said hook end of said leader rear portion; and a sheath of rotationally rigid material encasing the attachment between said between said hook and said hook end of said leader rear portion.

5. A fishing lure comprising:

a body having an axis and an axial bore;

an elastomeric mounting attached to said body; said mounting having a mounting bore;

a line extending through said mounting bore; and a leader attached to said line; said line having:

an end connection removably and frictionally retainable in said mounting in one of a plurality of selectable fixed rotational orientations with respect to said axis; said end connection connecting an end of said leader to said line; said end connection comprising:

a crimp connector for forming a loop in said end of said line; said crimp connector being frictionally retainable in said mounting bore.

6. The fishing lure claimed in claim 5, wherein said end connection is sheathed in a flexible material.

7. The fishing lure claimed in claim 5, wherein said mounting is adhesively attached to said body.

8. The fishing lure claimed in claim 5, wherein said mounting is frictionally attached to said body.

9. The fishing lure claimed in claim 8, wherein said body has a recess, said mounting has a tapered end, and said tapered end is wedged into said recess.

10. The fishing lure claimed in claim 9, wherein said body has an axial tube extending through said recess, and said mounting is frictionally engageable in said recess with said axial tube extending into said mounting bore.

11. A method for interconnecting a hook and a fishing lure, said fishing lure having a body, said body having an axis and an axial bore; said method comprising the steps of:

provide an elastomeric mounting having a mounting bore therethrough;

attaching said mounting to said body of said lure;

threading an end of a line through said axial bore and through said mounting bore;

connecting an end connector to said threaded end of said line;

providing a leader having a front end and a hook end; said leader having a longitudinal axis; said leader sufficiently torsionally rigid such that said hook end has a substantially fixed rotational orientation about said longitudinal axis relative to said front end of said leader;

forming a front connection by connecting said front end of said leader to said end connector;

forming a hook connection by connecting said hook end of said leader to said hook; and frictionally engaging said end connector in said mounting bore.

12. The method claimed in claim 11, wherein said step of attaching said mounting to said body of said lure comprises the step of adhesively attaching said mounting to said body of said lure.

13. The method claimed in claim 11, wherein:

said body has a recess and an axial tube extending through said recess; and said step of attaching said mounting to said body of said lure comprises the step of frictionally engaging said mounting in said recess with said axial tube extending into said mounting bore.

14. The method claimed in claim 11, wherein said end connector comprises a crimp sleeve, and said step of frictionally engaging said end connector in said mounting bore comprises the step of inserting said crimp sleeve into said mounting bore.

15. The method claimed in claim 11, further comprising the step of sheathing the front connection in a rotationally rigid material.

16. The method claimed in claim 11, further comprising the step of sheathing the hook connection in a rotationally rigid material.

* * * * *